United States Patent [19]

Bourland

[11] 4,377,664
[45] Mar. 22, 1983

[54] THERMOPLASTIC MOLDING COMPOSITION COMPRISING A METHYL METHACRYLATE POLYMER AND STYRENE-CITRACONIC ANHYDRIDE COPOLYMER

[75] Inventor: Larry G. Bourland, Downingtown, Pa.

[73] Assignee: Atlantic Richfield Company, Los Angeles, Calif.

[21] Appl. No.: 320,400

[22] Filed: Nov. 12, 1981

[51] Int. Cl.³ .................... C08L 33/12; C08L 25/14; C08L 25/08
[52] U.S. Cl. ........................ 525/94; 525/207
[58] Field of Search ................... 525/207, 94

[56] References Cited

U.S. PATENT DOCUMENTS

| | | | |
|---|---|---|---|
| 3,641,212 | 2/1972 | Narayana et al. | 525/207 |
| 3,720,734 | 3/1973 | Kopacki et al. | 525/207 |
| 3,883,617 | 5/1975 | Krieg et al. | 525/207 |

FOREIGN PATENT DOCUMENTS

| | | | |
|---|---|---|---|
| 684195 | 4/1964 | Canada | 525/207 |
| 54-50553 | 4/1979 | Japan | 525/207 |

*Primary Examiner*—Carman J. Seccuro
*Attorney, Agent, or Firm*—Dennis M. Kozak

[57] ABSTRACT

A thermoplastic molding composition which comprises a mixture of two thermoplastic synthetic polymers, which are at least partially miscible with one another, is disclosed. In one embodiment, the molding composition comprises a mixture of styrene-citraconic anhydride copolymer and methyl-methacrylate-styrene copolymer.

6 Claims, No Drawings

THERMOPLASTIC MOLDING COMPOSITION COMPRISING A METHYL METHACRYLATE POLYMER AND STYRENE-CITRACONIC ANHYDRIDE COPOLYMER

This invention relates to thermoplastic molding compositions.

More specifically, this invention relates to thermoplastic molding compositions which comprise a mixture of two thermoplastic synthetic polymers, the polymers being at least partially miscible with one another.

It is well known that there are few thermoplastic synthetic polymers that are totally or even partially miscible with one another; most plastic materials are incompatible or immiscible when an attempt is made to prepare a homogeneous mixture by mixing two or more such polymers. For this reason, incompatibility is the accepted rule and miscibility between polymers is the exception to the rule. Moreover, even though a number of miscible polymer blends have been discovered, no method of predicting compatibility of polymers yet exists to eliminate the trial-and-error method of discovering new miscible polymer blends.

According to this invention there is provided a thermoplastic molding composition comprising a mixture of two, at least partially miscible thermoplastic synthetic polymers. One of the thermoplastic synthetic polymers is a styrene-citraconic anhydride copolymer. The other thermoplastic synthetic polymer is selected from the group consisting of polymethylmethacrylate and methylmethacrylate-styrene copolymer.

As used herein, the term "total miscibility" (or "totally miscible") shall mean the ability of one polymer to mix or blend with another such that the mixture exhibits a single glass transition temperature (Tg) located intermediate between the Tg's of the individual polymers of which the mixture is comprised. Totally miscible polymers typically provide a polymer mixture which exhibits "rule of mixtures" physical properties.

As used herein, the term "partial miscibility" (or "partially miscible") shall mean the ability of one polymer to mix or blend with another such that the mixture exhibits two displaced Tg's and, accordingly, two phases with neither phase being that of a starting polymer component. Partially miscible polymers typically provide a mixture which exhibits physical property averages which are weighed according to the volume of each phase. Moreover, the composition of each phase may be estimated from the displaced Tg's using the Flory Fox relation for Tg dependence for random polymer mixtures.

The thermoplastic molding composition will contain from about 1 to about 99 weight percent of the styrene-citraconic anhydride copolymer. This particular copolymer is a random copolymer and will contain less than about 50 weight percent, citraconic anhydride. Preferably, the copolymer will contain less than 40 weight percent citraconic anhydride.

The thermoplastic molding composition will contain from about 99 to about 1 weight percent of a thermoplastic synthetic copolymer selected from the group consisting of polymethylmethacrylate and methylmethacrylate-styrene copolymer. Of course, mixtures of polymethylmethacrylate and methylmethacrylate-styrene copolymer can also be employed.

If employed, the methylmethacrylate-styrene copolymer is preferably a random copolymer which contains 60 weight percent or more methylmethacrylate. Preferably, the random copolymer will contain about 75 weight percent or more methylmethacrylate.

The methylmethacrylate-styrene copolymer may also be a block copolymer. If a block copolymer of methylmethacrylate-styrene is employed, it will contain about 30 weight percent or more, preferably 40 weight percent or more methylmethacrylate.

The random styrene-citraconic anhydride copolymer can be prepared by any suitable method. In one method such copolymers are formed in a continuous copolymerization process by introducing a mixture of styrene and citraconic anhydride with intense agitation at high temperature into a polymerization reactor and simultaneously withdrawing the same amount of the polymerization mixture from the reactor (for example, according to A. W. Hanson and R. L. Zimmerman, Industrial Engineering Chemistry 49, 1803 (1957); incorporated herein by reference).

The methylmethacrylate-styrene copolymers can be produced by any known process, e.g. block polymerization or polymerization in solution, in suspension, or in emulsion.

The thermoplastic molding compositions of this invention can be prepared by dry blending the polymer components at room temperature followed by melt mixing at a temperature above the softening points of the polymers using any conventional melt mixing apparatus, including extruders, calenders, kneaders and the like.

The thermoplastic molding compositions of this invention can also comprise optional art-recognized additives, such as pigments, fillers, impact-modifiers, stabilizers, fire retardants and lubricants.

The following examples set forth in table form further demonstrate the invention.

The compositions of eight polymers used to produce thermoplastic molding compositions are set forth in following Table I. All copolymers were random copolymers. All parts and percentages refer to weight and all glass transition temperatures were by differential scanning calorimetry.

TABLE I

| Example No. | Components | Proportion | Tg (°C.) |
|---|---|---|---|
| 1 | Polystyrene | 100 | 107 |
| 2 | Styrene-methylmethacrylate | 80:20 | 106 |
| 3 | Styrene-methylmethacrylate | 70:30 | 105 |
| 4 | Styrene-methylmethacrylate | 40:60 | 110 |
| 5 | Styrene-methylmethacylate | 25:75 | 115 |
| 6 | Polymethyl-methacylate | 100 | 114.5 |
| 7 | Styrene-citraconic anhydride | 81:19 | 167 |
| 8 | Styrene-citraconic anhydride | 60:40 | 187 |

Examples 9–20 in following Table II and Table III demonstrate thermoplastic molding compositions produced by mixing certain of the polymers of Table I. All compositions are melt blends of 50 weight percent of Polymer A and 50 weight percent of Polymer B.

TABLE II

Thermoplastic Molding Compositions (Examples 9-14)

| Example No. | Polymer A (of Example) | Polymer B (of Example) 81% Styrene - 19% Citraconic Anhydride (No. 7) | Composition Miscibility |
|---|---|---|---|
| 9 | Polystyrene (No. 1) | (107.5, 168.5) | I |
| 10 | Styrene-methylmethacrylate (No. 2) | (105, 167) | I |
| 11 | Styrene-methylmethacrylate (No. 3) | (104, 167) | I |
| 12 | Styrene-methylmethacrylate (No. 4) | (109, 168) | I |
| 13 | Styrene-methylmethacrylate (No. 5) | (114, 156.5) | PM |
| 14 | Polymethylmethacrylate (No. 6) | (134) | TM |

I = immiscible
PM = partially miscible
TM = totally miscible

TABLE III

Thermoplastic Molding Compositions (Examples 15-20)

| Example No. | Polymer A (of Example) | Polymer B (of Example) 60% Styrene - 40% Citraconic Anhydride (No. 8) | Composition Miscibility |
|---|---|---|---|
| 15 | Polystyrene (No. 1) | (107, 191) | I |
| 16 | Styrene-methylmethacrylate (No. 2) | (101, 188) | I |
| 17 | Styrene-methylmethacrylate (No. 3) | (103, 189) | I |
| 18 | Styrene-methylmethacrylate (No. 4) | (106, 187) | I |
| 19 | Styrene-methylmethacrylate (No. 5) | (111, 189) | I |
| 20 | Polymethylmethacrylate (No. 6) | (118, 176.5) | PM |

I = immiscible
PM = partially miscible

The data set forth in Tables II and III serve to illustrate that the thermoplastic molding compositions of this invention which comprise a melt blend of (1) a copolymer of styrene-citraconic anhydride which contains less than about 50 weight percent citraconic anhydride and (2) a polymer selected from the group consisting of polymethylmethacrylate and styrene-methylmethacrylate copolymer exhibit at least partial miscibility, as evidenced by differential scanning calorimetry determination of their glass transition temperatures.

It will be evident from the foregoing that various modifications can be made to this invention. Such, however, are considered within the scope of this invention.

What is claimed is:

1. A thermoplastic molding composition comprising a mixture of two at least partially miscible thermoplastic synthetic polymers, one polymer being styrene-citraconic anhydride copolymer and the other polymer being selected from the group consisting of polymethylmethacrylate and methylmethacrylate-styrene copolymer in which said styrene-citraconic anhydride copolymer contains less than about 50 weight percent citraconic anhydride.

2. The thermoplastic molding composition of claim 1 in which said one polymer is employed in an amount of from about 1 to about 99 weight percent and said other polymer is employed in an amount of from about 99 to about 1 weight percent.

3. The thermoplastic molding composition of claim 1 in which said styrene-citraconic anhydride copolymer contains less than about 40 weight percent citraconic anhydride.

4. The thermoplastic molding composition of claim 1 in which said other polymer is a block methylmethacrylate-styrene copolymer and contains about 30 weight percent or more methylmethacrylate.

5. The thermoplastic molding composition of claim 1 in which said other polymer is a random methylmethacrylate-styrene copolymer and contains about 60 weight percent or more methylmethacrylate.

6. A thermoplastic molding composition comprising a totally miscible mixture of styrene-citraconic anhydride copolymer and polymethylmethacrylate homopolymer.

* * * * *